United States Patent
Fukui et al.

(10) Patent No.: US 12,227,655 B2
(45) Date of Patent: Feb. 18, 2025

(54) ORGANOPOLYSILOXANE, METHOD OF PRODUCING THE SAME, AND THERMALLY CONDUCTIVE SILICONE COMPOSITION

(71) Applicant: DOW TORAY CO., LTD., Tokyo (JP)

(72) Inventors: Hiroshi Fukui, Ichihara (JP); Kyoko Toyama, Ichihara (JP); Norihisa Kishimoto, Ichihara (JP)

(73) Assignee: DOW TORAY CO., LTD., Tokyo (JP)

(*) Notice: Subject to any disclaimer, the term of this patent is extended or adjusted under 35 U.S.C. 154(b) by 541 days.

(21) Appl. No.: 17/772,852

(22) PCT Filed: Oct. 30, 2020

(86) PCT No.: PCT/JP2020/040773
§ 371 (c)(1),
(2) Date: Apr. 28, 2022

(87) PCT Pub. No.: WO2021/085586
PCT Pub. Date: May 6, 2021

(65) Prior Publication Data
US 2022/0380550 A1     Dec. 1, 2022

(30) Foreign Application Priority Data
Oct. 30, 2019   (JP) .................. 2019-197782

(51) Int. Cl.
| C09C 3/12 | (2006.01) |
| C08G 77/18 | (2006.01) |
| C08G 77/20 | (2006.01) |
| C08K 3/22 | (2006.01) |
| C08K 9/06 | (2006.01) |

(52) U.S. Cl.
CPC ............ *C09C 3/12* (2013.01); *C08G 77/18* (2013.01); *C08G 77/20* (2013.01); *C08K 3/22* (2013.01); *C08K 9/06* (2013.01); *C08K 2003/2227* (2013.01); *C08K 2201/001* (2013.01); *C08K 2201/003* (2013.01)

(58) Field of Classification Search
CPC ............ C08G 77/18; C08G 77/20; C09C 3/12
USPC .................................................. 528/32, 34
See application file for complete search history.

(56) References Cited

U.S. PATENT DOCUMENTS

| 4,269,753 A | 5/1981 | Mine et al. |
| 4,477,641 A | 10/1984 | Matsumoto |
| 5,194,649 A | 3/1993 | Okawa |
| 5,300,608 A * | 4/1994 | Chu ................ C08G 77/20 556/466 |
| 5,470,934 A | 11/1995 | Saruyama et al. |
| 5,486,635 A | 1/1996 | Okawa |
| 5,514,765 A | 5/1996 | Hori et al. |
| 6,844,393 B2 | 1/2005 | Goto et al. |
| 2006/0135687 A1 | 6/2006 | Fukui |
| 2007/0282060 A1 * | 12/2007 | Scholey ................ C08L 83/04 524/588 |
| 2008/0085966 A1 | 4/2008 | Fukui et al. |
| 2011/0034581 A1 * | 2/2011 | Bae .................... C08L 85/00 524/588 |
| 2014/0249326 A1 | 9/2014 | Paulasaari |
| 2015/0021643 A1 | 1/2015 | Kurino et al. |

FOREIGN PATENT DOCUMENTS

| CN | 101151326 A | 3/2008 | |
| CN | 109722032 A | 5/2019 | |
| DE | 4234959 C1 * | 4/1994 | ........... C08G 77/045 |
| EP | 645395 A1 * | 3/1995 | ........... C07F 7/0838 |
| GB | 2144758 A | 3/1985 | |
| JP | S55118958 A | 9/1980 | |
| JP | S59152955 A | 8/1984 | |
| JP | S6076536 A | 5/1985 | |
| JP | H069657 A | 1/1994 | |
| JP | H07138267 A | 5/1995 | |
| JP | H0834922 A | 2/1996 | |
| JP | H107801 A | 1/1998 | |
| JP | H10158406 A | 6/1998 | |

(Continued)

OTHER PUBLICATIONS

International Search Report (with English translation) for PCT/JP2020/040773 dated Jan. 12, 2021, 5 pages.
Machine assisted English translation of JPH07138267 obtained from https://patents.google.com/patent on Nov. 10, 2022, 5 pages.
Machine assisted English translation of JP2016125001 obtained from https://patents.google.com/patent on Nov. 10, 2022, 8 pages.
Machine assisted English translation of JP2003213135 obtained from https://patents.google.com/patent on Nov. 10, 2022, 7 pages.
Machine assisted English translation of JP2008038137 obtained from https://patents.google.com/patent on Nov. 10, 2022, 14 pages.
Machine assisted English translation of JPH107801 obtained from https://patents.google.com/patent on Nov. 10, 2022, 9 pages.

(Continued)

*Primary Examiner* — Marc S Zimmer
(74) *Attorney, Agent, or Firm* — Warner Norcross + Judd LLP

(57) ABSTRACT

An organopolysiloxane is provided. The organopolysiloxane is represented by a general formula.
In the general formula, $R^1$ are the same or different aliphatic unsaturated monovalent hydrocarbon groups having 2 to 12 carbon atoms, $R^2$s are the same or different monovalent hydrocarbon groups having 1 to 12 carbon atoms and not having an aliphatic unsaturated bond, $R^3$s are the same or different alkyl groups having 1 to 3 carbon atoms, "n" is an integer of from 1 and 500, and "a" is 0 or 1. A thermally conductive silicone composition having the organopolysiloxane as a component is also provided. The organopolysiloxane can be used as a surface treatment agent for a thermally conductive filler. The organopolysiloxane provides for favorable handling/workability of compositions even if such compositions are highly loaded with a thermally conductive filler.

13 Claims, No Drawings

(56) References Cited

FOREIGN PATENT DOCUMENTS

| | | |
|---|---|---|
| JP | 2003213133 A | 7/2003 |
| JP | 2003213135 A | 7/2003 |
| JP | 2004262972 A | 9/2004 |
| JP | 2006169411 A | 6/2006 |
| JP | 2008038137 A | 2/2008 |
| JP | 2013136662 A | 7/2013 |
| JP | 2016125001 A | 7/2016 |
| WO | 2006107003 A1 | 10/2006 |
| WO | 2013133430 A1 | 9/2013 |
| WO | 2018109425 A1 | 6/2018 |

OTHER PUBLICATIONS

Machine assisted English translation of JPH10158406 obtained from htttps://patents.google.com/patent on Jan. 13, 2023, 6 pages.
Machine assisted English translation of JP2013136662 obtained from https://patents.google.com/patent on Jan. 13, 2023, 6 pages.
Machine assisted English translation of CN109722032 obtained from https://patents.google.com/patent on Jan. 13, 2023, 11 pages.

\* cited by examiner

ORGANOPOLYSILOXANE, METHOD OF PRODUCING THE SAME, AND THERMALLY CONDUCTIVE SILICONE COMPOSITION

CROSS-REFERENCE TO RELATED APPLICATIONS

This application is the U.S. National Stage of International Application No. PCT/JP2020/040773 filed on 30 Oct. 2020, which claims priority to and all advantages of Japanese Application No. 2019-197782 filed on 30 Oct. 2019, the content of which is incorporated herein by reference.

TECHNICAL FIELD

The present invention relates to a novel organopolysiloxane, a method for producing thereof, and a thermally conductive silicone composition using the organopolysiloxane.

BACKGROUND ART

Patent Documents 1 to 3 disclose that an organopolysiloxane having a silicon atom-bonded hydrolyzable group at one molecular chain terminal acts as a surface treatment agent for a thermally conductive filler that is used to obtain a silicone composition with high thermal conductivity by filling with a large amount of a thermally conductive filler. However, even if such an organopolysiloxane is used, when the silicone composition is highly loaded with a thermally conductive filler such as alumina or the like, the viscosity of a resulting silicone composition increases rapidly, resulting in a significant decrease in handling/workability and moldability thereof.

PRIOR ART DOCUMENTS

Patent Documents

Patent Document 1: Japanese Patent Application Publication No. 2003-213133 A
Patent Document 2: Japanese Patent Application Publication No. 2004-262972 A
Patent Document 3: Japanese Patent Application Publication No. 2008-038137 A

SUMMARY OF THE INVENTION

Problems to be Solved by the Invention

An object of the present invention is to provide a novel organopolysiloxane having aliphatic unsaturated monovalent hydrocarbon groups at both molecular chain terminals and having a silicon atom-bonded hydrolyzable group at one molecular chain terminal, and to provide a method for producing the novel organopolysiloxane. Furthermore, another object of the present invention is to provide a thermally conductive silicone composition having such an organopolysiloxane as a main agent or a surface treatment agent for a thermally conductive filler and having favorable handling/workability even if it is highly loaded with a thermally conductive filler.

Means for Solving the Problems

An organopolysiloxane of the present invention is represented by the general formula:

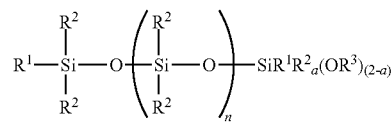

[Formula 1]

wherein, $R^1$s are the same or different aliphatic unsaturated monovalent hydrocarbon groups having 2 to 12 carbon atoms, $R^2$s are the same or different monovalent hydrocarbon groups having 1 to 12 carbon atoms and not having an aliphatic unsaturated bond, $R^3$s are the same or different alkyl groups having 1 to 3 carbon atoms, "n" is an integer of from 1 and 500, and "a" is 0 or 1.

The organopolysiloxane is suitable as a surface treatment agent for an inorganic powder, and is particularly suitable as a surface treatment agent for a thermally conductive powder.

A method for producing the organopolysiloxane of the present invention is characterized by dealcohol condensation reacting with an organopolysiloxane represented by the general formula:

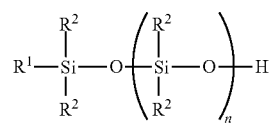

[Formula 2]

wherein, $R^1$ is an aliphatic unsaturated monovalent hydrocarbon group having 2 to 12 carbon atoms, $R^2$s are the same or different monovalent hydrocarbon groups having 1 to 12 carbon atoms and not having an aliphatic unsaturated bond, and "n" is an integer of from 1 and 500; and
an alkoxysilane represented by the general formula

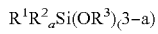

wherein, $R^1$ is the same as above or a different aliphatic unsaturated monovalent hydrocarbon group having 2 to 12 carbon atoms, $R^2$ is the same as above or a different monovalent hydrocarbon group having 1 to 12 carbon atoms and not having an aliphatic unsaturated bond, $R^3$s are the same or different alkyl groups having 1 to 3 carbon atoms, and "a" is 0 or 1.

A thermally conductive silicone composition of the present invention comprises:
(A) an organopolysiloxane represented by the general formula:

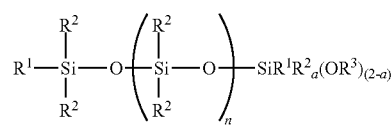

[Formula 3]

wherein, $R^1$s are the same or different aliphatic unsaturated monovalent hydrocarbon groups having 2 to 12 carbon atoms, $R^2$s are the same or different monovalent hydrocarbon groups having 1 to 12 carbon atoms and not having an aliphatic unsaturated bond, $R^3$s are the same or different alkyl groups having 1 to 3 carbon atoms, "n" is an integer of from 1 and 500, and "a" is 0 or 1; and (B) a thermally conductive filler.

An average particle diameter of component (B) is preferably from 0.01 to 100 µm. Furthermore, component (B) is preferably an alumina powder, more preferably a mixture of ($B_1$) a spherical or rounded alumina powder with an average particle diameter of 5 to 50 µm (but not including 5 µm) and ($B_2$) a spherical or amorphous alumina powder with an average particle diameter of 0.1 to 5 µm, and particularly preferably a mixture of 30 to 90 mass % of component ($B_1$) and 10 to 70 mass % of component ($B_2$) when component (B) is the mixture of component ($B_1$) and component ($B_2$).

In the composition above, an amount of component (B) is preferably within a range of 500 to 3,000 parts by mass relative to 100 parts by mass of component (A).

The composition above is preferably a curable thermally conductive silicone composition by further blending a (C) crosslinking agent.

Effects of the Invention

The organopolysiloxane of the present invention is a novel compound having aliphatic unsaturated monovalent hydrocarbon groups at both molecular chain terminals and having a silicon atom-bonded hydrolyzable group at one molecular chain terminal. Furthermore, the thermally conductive silicone composition of the present invention uses such an organopolysiloxane as a main agent or a surface treatment agent for a thermally conductive filler, and therefore, handling workability is favorable even if it is highly loaded with a thermally conductive filler in order to obtain a silicone composition with high thermal conductivity.

Description of the Preferred Embodiment

First, the organopolysiloxane of the present invention will be described in detail. The organopolysiloxane of the present invention is represented by the general formula:

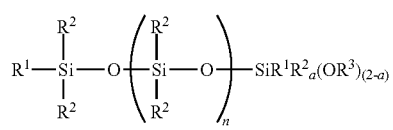

[Formula 4]

In the above formula, $R^1$s are the same or different aliphatic unsaturated monovalent hydrocarbon groups having 2 to 12 carbon atoms, and specific examples include: vinyl groups, allyl groups, butenyl groups, hexenyl groups, decenyl groups, undecenyl groups, dodecenyl groups and other straight chain alkenyl groups; isopropenyl groups, 2-methyl-2-propenyl groups, 2-methyl-10-undecenyl groups and other branched alkenyl groups; vinylcyclohexyl groups and other aliphatic unsaturated cyclic alkyl groups; vinylphenyl groups and other aliphatic unsaturated group-containing aryl groups; and vinylbenzyl groups, vinylphenethyl groups and other aliphatic unsaturated group-containing aralkyl groups. Straight chain alkenyl groups are preferred, and vinyl groups, allyl groups, and hexenyl group are particularly preferred. The position of the aliphatic unsaturated bond in $R^1$ is not limited, but is preferably a position that is farther away from the silicon atom to which $R^1$ is bonded.

Furthermore, in the above formula, $R^2$s are the same or different monovalent hydrocarbon groups having 1 to 12 carbons without an aliphatic unsaturated bond, and specific examples include: methyl groups, ethyl groups, propyl groups, butyl groups and other straight chain alkyl groups; isopropyl groups, tertbutyl groups, tertpentyl groups and other branched alkyl groups; cyclopentyl groups, cyclohexyl groups and other cyclic alkyl groups; phenyl groups, tolyl groups, xylyl groups and other aryl groups; benzyl groups, phenethyl groups and other aralkyl groups; and 3-chloropropyl groups, 3,3,3-trifluoropropyl groups and other halogenated alkyl groups. Alkyl groups and aryl groups are preferred, alkyl groups having 1 to 4 carbon atoms are more preferred, and methyl groups and ethyl groups are particularly preferred.

Furthermore, in the above formula, $R^3$s are the same or different alkyl groups having 1 to 3 carbon atoms, and specific examples include methyl groups, ethyl groups, and propyl groups. Methyl groups and ethyl groups are preferred.

Furthermore, in the above formula, "n" is an integer of from 1 to 500, and preferably, "n" is at least 5, at least 10, at least 15, or at least 20, while at most 400, at most 300, or at most 200. The "n" range can be an arbitrary range in which the upper limits and lower limits described above are combined. This is because when "n" is equal to or above the lower limit of the aforementioned range, volatility is inferior, while when "n" is equal to or below the upper limit of the aforementioned range, the surface of an inorganic filler, and particularly a thermally conductive filler, can be sufficiently treated.

Furthermore, in the above formula, "a" is 0 or 1, and preferably 0.

An example of a method for producing such an organopolysiloxane includes a method of dealcohol condensation reacting with an organopolysiloxane represented by the general formula:

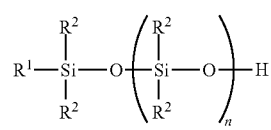

[Formula 5]

and an alkoxysilane represented by

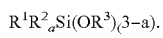

$R^1$, $R^2$, and "n" in the organopolysiloxane above are the same as described above. Such an organopolysiloxane can be prepared, for example, by non-equilibrium polymerization reacting a cyclic trisiloxane in the presence or absence of an organosilane or organosiloxane having a hydroxyl group on one molecular chain terminal, which serves as a molecular weight regulator, using an alkyl lithium or lithium silanolate as a polymerization initiator, and then stopping the non-equilibrium polymerization reaction with an acid, as disclosed in U.S. Pat. No. 5,486,635 A (Japanese Patent Application Publication No. H07-292109 A) or Japanese Patent Application Publication No. H10-7801 A. Note that after silylating or acetylating a trace amount of a silanol group-containing impurity present in the cyclic trisiloxane, the non-equilibrium polymerization reaction is preferably performed in the presence of a nitrile compound or ester compound and a polar solvent that does not have active hydrogen. This can suppress by-production of dual-terminated non-functional diorganopolysiloxanes and dual-terminated functional diorganopolysiloxanes due to a dimerization reaction or equilibration reaction of a-hydroxydiorganopolysiloxane occurring as side reactions during the polymerization of cyclic trisiloxane.

$R^1$, $R^2$, and $R^3$ in the alkoxysilanes above are the same as described above. Furthermore, "a" in the alkoxysilanes above is 0 or 1, and preferably 0. Examples of such alkoxysilanes includes vinyltrimethoxysilane, allyltrimethoxysilane, vinyltriethoxysilane, allyltriethoxysilane, vinyldimethoxyethoxysilane, hexenyltrimethoxysilane, hexenyltriethoxysilane, octenyltrimethoxysilane, and octenyltriethoxysilane. Equimolar or more of the alkoxysilane is preferably added to the organopolysiloxane above, and an excess amount is preferably added due to being able to suppress byproducts.

The aforementioned organopolysiloxane and alkoxysilane can be dealcohol condensation reacted to prepare the organopolysiloxane of the present invention. An acid catalyst may be added to accelerate the dealcohol condensation reaction. Examples of the acids include hydrochloric acids, sulfuric acids, acetic acids, and propionic acids. The dealcohol condensation reaction can proceed at room temperature, but can be accelerated by heating, and alcohol produced by the condensation reaction is particularly preferably removed under reduced pressure.

Examples of the organopolysiloxane of the present invention include the following:

a dimethylpolysiloxane represented by the formula:

[Formula 6]

$$CH_2{=}CH{-}\underset{CH_3}{\overset{CH_3}{Si}}{-}O{-}\left(\underset{CH_3}{\overset{CH_3}{Si}}{-}O\right)_{10}\underset{OCH_3}{\overset{OCH_3}{Si}}{-}CH{=}CH_2$$

a dimethylpolysiloxane represented by the formula:

[Formula 7]

$$CH_2{=}CH{-}\underset{CH_3}{\overset{CH_3}{Si}}{-}O{-}\left(\underset{CH_3}{\overset{CH_3}{Si}}{-}O\right)_{20}\underset{OCH_3}{\overset{OCH_3}{Si}}{-}CH{=}CH_2$$

a dimethylpolysiloxane represented by the formula:

[Formula 8]

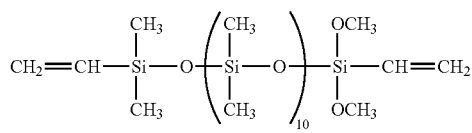

a dimethylpolysiloxane represented by the formula:

[Formula 9]

$$CH_2{=}CH{-}\underset{CH_3}{\overset{CH_3}{Si}}{-}O{-}\left(\underset{CH_3}{\overset{CH_3}{Si}}{-}O\right)_{50}\underset{OCH_3}{\overset{OCH_3}{Si}}{-}CH{=}CH_2$$

a dimethylpolysiloxane represented by the formula:

[Formula 10]

$$CH_2{=}CH{-}\underset{CH_3}{\overset{CH_3}{Si}}{-}O{-}\left(\underset{CH_3}{\overset{CH_3}{Si}}{-}O\right)_{70}\underset{OCH_3}{\overset{OCH_3}{Si}}{-}CH{=}CH_2$$

a dimethylpolysiloxane represented by the formula:

[Formula 11]

$$CH_2{=}CH{-}\underset{CH_3}{\overset{CH_3}{Si}}{-}O{-}\left(\underset{CH_3}{\overset{CH_3}{Si}}{-}O\right)_{80}\underset{OCH_3}{\overset{OCH_3}{Si}}{-}CH{=}CH_2$$

a dimethylpolysiloxane represented by the formula:

[Formula 12]

$$CH_2{=}CH{-}\underset{CH_3}{\overset{CH_3}{Si}}{-}O{-}\left(\underset{CH_3}{\overset{CH_3}{Si}}{-}O\right)_{90}\underset{OCH_3}{\overset{OCH_3}{Si}}{-}CH{=}CH_2$$

a dimethylpolysiloxane represented by the formula:

[Formula 13]

$$CH_2{=}CH{-}\underset{CH_3}{\overset{CH_3}{Si}}{-}O{-}\left(\underset{CH_3}{\overset{CH_3}{Si}}{-}O\right)_{150}\underset{OCH_3}{\overset{OCH_3}{Si}}{-}CH{=}CH_2$$

and a dimethylpolysiloxane represented by the formula:

[Formula 14]

$$CH_2{=}CH{-}\underset{CH_3}{\overset{CH_3}{Si}}{-}O{-}\left(\underset{CH_3}{\overset{CH_3}{Si}}{-}O\right)_{250}\underset{OCH_3}{\overset{OCH_3}{Si}}{-}CH{=}CH_2$$

The organopolysiloxane of the present invention may contain a small amount of a by-product derived from the polymerization initiators above if used as a surface treatment agent of an inorganic powder described later.

The organopolysiloxane of the present invention is useful as a surface treatment agent for an inorganic powder, and is particularly useful as a surface treatment agent for a thermally conductive powder. The inorganic powders to which the organopolysiloxane of the present invention can be applied include: metal powders such as aluminum powders, copper powders, nickel powders, and the like; metal oxide powders such as alumina powders, magnesium oxide powders, beryllium oxide powders, chromium oxide powders, titanium oxide powders, zinc oxide powders, iron oxide powders, and the like; metal nitride powders such as boron nitride powders, aluminum nitride powders, and the like; metal carbide powders such as boron carbide powders, titanium carbide powders, silicon carbide powders, and the like; metal oxide powders obtained by coating a metal on the surface to provide electrical conductivity; and fumed silica, hydrophobic fumed silica, precipitated silica, fused silica, diatomaceous earth, talc, calcium carbonate, manganese carbonate and cerium hydroxide. A method of treating the surface of these inorganic powders is not limited, treatment can be performed by a well-known method.

Next, the thermally conductive silicone composition of the present invention will be described in detail.

The thermally conductive silicone composition of the present invention comprises:

(A) an organopolysiloxane represented by the general formula:

[Formula 15]

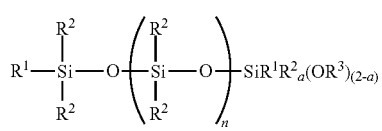

wherein, $R^1$ is an aliphatic unsaturated monovalent hydrocarbon group having 2 to 12 carbon atoms, $R^2$s are the same or different monovalent hydrocarbon groups having 1 to 12 carbon atoms and not having an aliphatic unsaturated bond, $R^3$ is an alkyl groups having 1 to 3 carbon atoms, "n" is an integer of from 1 and 500, and "a" is 0 or 1; and (B) a thermally conductive filler.

Component (A) is the organopolysiloxane described above, and functions as a main agent of the present composition or as a surface treatment agent for component (B). In addition to component (A), the present composition may contain an organopolysiloxane of a byproduct derived from a polymerization initiator when preparing component (A), or another organopolysiloxane. When an arbitrary organopolysiloxane is used as a main agent in the present composition, component (A) functions solely as a surface treatment agent for component (B).

Examples of organopolysiloxanes other than component (A) include those having a straight chain, branched, partially branched straight chain, or dendrimer-like molecular structure, and preferably a straight chain or partially branched straight chain. Specific examples include dimethylpolysiloxanes blocked with dimethylvinylsiloxy groups at both molecular chain terminals, dimethylpolysiloxanes blocked with methylphenylvinylsiloxy groups at both molecular chain terminals, copolymers of dimethylsiloxane and methylphenylsiloxane blocked with dimethylvinylsiloxy groups at both molecular chain terminals, copolymers of dimethylsiloxane and methylvinylsiloxane blocked with dimethylvinylsiloxy groups at both molecular chain terminals, copolymers of dimethylsiloxane and methylvinylsiloxane blocked with trimethylsiloxy groups at both molecular chain terminals, methyl(3,3,3-trifluoropropyl)polysiloxane blocked with a dimethylvinylsiloxy group at both molecular chain terminals, copolymers of dimethylsiloxane and methylvinylsiloxane blocked with silanol groups at both molecular chain terminals, copolymers of dimethylsiloxane, methylvinylsiloxane and methylphenylsiloxane blocked with silanol groups at both molecular chain terminals, organosiloxane copolymers consisting of a siloxane unit represent by the formula: $(CH_3)_3SiO_{1/2}$, a siloxane unit represented by the formula: $(CH_3)_2(CH_2=CH)SiO_{1/2}$, a siloxane unit represented by the formula: $CH_3SiO_{3/2}$, and a siloxane unit represented by the formula $(CH_3)_2SiO_{2/2}$, dimethylpolysiloxane blocked with silanol groups at both molecular chain terminals, copolymers of dimethylsiloxane and methylphenylsiloxane blocked with silanol groups at both molecular chain terminals, dimethylpolysiloxane blocked with trimethoxysiloxy groups at both molecular chain terminals, copolymers of dimethylsiloxane and methylphenylsiloxane blocked with trimethoxysilyl groups at both molecular chain terminals, dimethylpolysiloxane blocked with methyldimethoxysiloxy groups at both molecular chain terminals, dimethylpolysiloxane blocked with triethoxysiloxy groups at both molecular chain terminals, dimethylpolysiloxane blocked with trimethoxysilylethyl groups at both molecular chain terminals, and mixtures of two or more thereof.

A viscosity of such an organopolysiloxane at 25° C. is not limited, but is preferably within a range of 20 to 100,000 mPa·s, even more preferably within a range of 50 to 100,000 mPa·s, even more preferably within a range of 50 to 50,000 mPa·s, and particularly preferably within a range of 100 to 50,000 mPa·s. Note that the viscosity can be measured by a rotational viscometer in accordance with JIS K7117-1. This is because if the viscosity at 25° C. is below the lower limit of the range above, the physical properties of a resulting composition will be significantly reduced, while if the viscosity is above the upper limit of the range above, the handling/workability of a resulting composition will be significantly reduced.

The thermally conductive filler for component (B) is a component that provides thermal conductivity to the present composition, and examples include: metal powders such as aluminum powders, copper powders, nickel powders, and the like; metal oxide powders such as alumina powders, magnesium oxide powders, beryllium oxide powders, chromium oxide powders, titanium oxide powders, and the like; metal nitride powders such as boron nitride powders, aluminum nitride powders, and the like; metal carbide powders such as boron carbide powders, titanium carbide powders, silicon carbide powders, and the like; metal oxide powders obtained by coating a metal on the surface to provide electrical conductivity; and mixtures of two or more thereof. Furthermore, a shape of component (B) can be, for example, spherical, rounded, needle-like, disk-like, rod-like, or amorphous. If the present composition or a crosslinked product of the present composition is required to have electrical insulation properties, component (B) is preferably a metal oxide powder, metal nitride powder, or metal carbide powder, and particularly preferably an alumina powder.

An average particle diameter of component (B) is not limited, but is preferably within a range of 0.1 to 100 μm, and even more preferably within a range of 0.1 to 50 μm. Furthermore, when used as component (B), the alumina powder is preferably a mixture of ($B_1$) spherical alumina powder with an average particle diameter of 5 to 50 μm (but not including 5 μm) and ($B_2$) spherical or amorphous alumina powder with an average particle diameter of 0.1 to 5 μm. Furthermore, in the mixture, an amount of the aforementioned component ($B_1$) is within a range of 30 to 90% by mass, and the amount of the aforementioned component ($B_2$) is preferably within a range of 10 to 70% by mass.

In the present composition, an amount of component (B) is not limited, but in order to provide favorable thermal conductivity, its volume % is preferably at least 30 volume % in the present composition, more preferably within a range of 30 to 90 volume %, even more preferably within a range of 60 to 90 volume %, and particularly preferably within a range of 80 to 90 volume %. Similarly, its mass % is preferably at least 50 mass % in the present composition, even more preferably within a range of 70 to 98 mass %, and particularly preferably within a range of 90 to 97 mass %. Specifically, when component (A) is the main agent, the amount of component (B) is preferably within a range of 500 to 3,500 parts by mass, even more preferably within a range of 500 to 3,000 parts by mass, and particularly preferably within a range of 800 to 3,000 parts by mass, each relative to 100 parts by mass of component (A). On the other hand, when component (A) functions as a surface treatment agent for component (B) and an organopolysiloxane other than component (A) is the main agent, the amount is preferably within a range of 500 to 3,500 parts by mass, even more preferably with a range of 500 to 3,000 parts by mass, and particularly preferably within a range of 800 to 3,000 parts by mass, each relative to 100 parts by mass of the organopolysiloxane. This is because if the amount of component (B) is less than the lower limit of the range above, the thermal conductivity or electrical conductivity of a resulting composition is insufficient. On the other hand, if the amount exceeds the upper limit of the range above, the viscosity of a resulting composition increases, a uniform composition cannot be obtained, and the handling/workability thereof significantly decreases.

The present composition may be in the form of a non-crosslinkable grease, or can be thickened or cured by crosslinking by further including (C) a crosslinking agent to provide cross-linkability. The crosslinking reaction thereof is not limited, and examples include hydrosilylation reactions, condensation reactions, and free radical reactions with an organic peroxide.

When the present composition can be hydrosilylation reacted, component (C) contains an organopolysiloxane having on average two or more silicon atom-bonded hydrogen atoms per molecule and a platinum-based catalyst. Examples of groups bonded to the silicon atom bonds in this organopolysiloxane include straight chain alkyl groups, branched alkyl groups, cyclic alkyl groups, aryl groups, aralkyl groups, and halogenated alkyl groups, as described above. Alkyl groups and aryl groups are preferred, and methyl groups and phenyl groups are particularly preferred. Furthermore, a kinematic viscosity at 25° C. of this organopolysiloxane is not limited, but is preferably within a range of 1 to 1,000 mm$^2$/s, and particularly preferably within a range of 1 to 500 mm$^2$/s. Note that the kinetic viscosity can be measured by an Ubbelohde viscometer in accordance with JIS Z8803.

A molecular structure of such an organopolysiloxane is not limited. Examples include straight chain, branched, partially branched straight chain, cyclic, or dendrimer-like molecular structures. Examples of such an organopolysiloxane include monopolymers having these molecular structures, copolymers having these molecular structures, or mixtures thereof.

Examples of such an organopolysiloxane include dimethylpolysiloxanes blocked with dimethylhydrogensiloxy groups at both molecular chain terminals, copolymers of dimethylsiloxane and methylhydrogensiloxane blocked with trimethylsiloxy groups at both molecular chain terminals, copolymers of dimethylsiloxane and methylhydrogensiloxane blocked with dimethylhydrogensiloxy groups at both molecular chain terminals, organosiloxane copolymers consisting of a siloxane unit represented by the formula: $(CH_3)_3SiO_{1/2}$, a siloxane unit represented by the formula: $(CH_3)_2HSiO_{1/2}$, and a siloxane unit represented by the formula: $SiO_{4/2}$, and mixtures of two or more thereof.

In the present composition, an amount of the organopolysiloxane is an amount sufficient to crosslink the present composition. Specifically, the amount is preferably within a range where the silicon atom-bonded hydrogen atoms in the present component is 0.1 to 10 mols, more preferably within a range of 0.1 to 5 mols, and particularly preferably within a range of 0.1 to 3.0 mols, each relative to 1 mol of aliphatic unsaturated monovalent hydrocarbon groups in component (A) and other than in component (A). This is because if the amount of the present component is below the lower limit of the range above, a resulting composition is not sufficiently crosslinked. On the other hand, if the amount is above the upper limit of the range above, a resulting crosslinked product is a very hard cured product, and numerous cracks are generated on the surface.

Furthermore, platinum-based catalysts are catalysts for promoting crosslinking of the present composition. Examples include platinum chlorides, alcohol-modified platinum chlorides, olefin complexes of platinum, alkenylsiloxane complexes of platinum, and carbonyl complexes of platinum.

In the present component, an amount of the platinum-based catalyst is an amount sufficient to promote crosslinking of the present composition. Specifically, the amount is preferably within a range where platinum metal in the present component is 0.1 to 1000 ppm, and particularly preferably within a range of 0.1 to 500 ppm, each based on mass units with regard to component (A) and an arbitrary component other than component (A). This is because if the amount of the present component is below the lower limit of the range above, a resulting composition is not sufficiently crosslinked. On the other hand, if the amount is above the upper limit of the range above, the crosslinking reaction of a resulting composition is not significantly accelerated.

In particular, when the present composition can be crosslinked by a hydrosilylation reaction, 2-methyl-3-butyn-2-ol, 2-phenyl-3-butyn-2-ol, 1-ethynyl-1-cyclohexanol, and other acetylene compounds; 3-methyl-3-penten-1-yne, 3,5-dimethyl-3-hexen-1-yne, and other ene-yne compounds; 1,3,5,7-tetramethyl-1,3,5,7-tetravinylcyclotetrasiloxane, 1,3,5,7-tetramethyl-1,3,5,7-tetrahexenylcyclotetrasiloxane, and other alkenyl group-containing cyclosiloxanes; and hydrazine compounds, phosphine compounds, mercaptan compounds, and other reaction inhibitors are preferably included in order to adjust the cross-linking speed and improve the handling/workability. An amount of the reaction inhibitor is not limited, but is preferably within a range of 0.0001 to 1.0% by mass of the present composition.

Furthermore, when the present composition can be cross-linked by a condensation reaction, component (C) contains a silane or a partially hydrolyzed product thereof having at least three silicon atom-bonded hydrolyzable groups per molecule and/or a condensation-reaction catalyst. Examples of silicon atom-bonded hydrolyzable groups in the silane include alkoxy groups as described above, alkoxyalkoxy groups, acyloxy groups, ketoxime groups, alkenoxy groups, amino groups, aminoxy groups, and amide groups. Furthermore, in addition to the hydrolyzable groups above, a silicon atom of the silane may be bonded with, for example, a straight chain linear alkyl group, branched alkyl group, cyclic alkyl group, alkenyl group, aryl group, aralkyl group, and alkyl halide group as described above. Examples of such silanes or partially hydrolyzed products thereof include methyltriethoxysilane, vinyltriethoxysilane, vinyltriacethoxysilane, and ethyl orthosilicate.

In the present composition, an amount of the silane or partially hydrolyzed product is an amount sufficient to crosslink the present composition. Specifically, the amount is preferably within a range of 0.01 to 20 parts by mass, and particularly preferably within a range of 0.1 to 10 parts by mass, each relative to 100 parts by mass of component (A) or an arbitrary organopolysiloxane other than component (A). This is because if the amount of the silane or partially hydrolyzed product thereof is less than the lower limit of the range above, the storage stability of a resulting composition is reduced, and the adhesiveness is reduced, while if the amount exceeds the upper limit of the range above, the crosslinking reaction of a resulting composition is significantly slower.

Furthermore, the condensation-reaction catalyst is not essential when, for example, a silane having a hydrolyzable group such as an aminoxy group, amino group, or ketoxime group is used as component (C). Examples of the condensation reaction catalyst include: tetrabutyltitanate, tetraisopropyltitanate, and other organic titanium acid esters; diisopropoxybis(acetylacetate)titanium, diisopropoxybis(ethylacetoacetate)titanium, and other organic titanium chelated compounds; aluminum tris(acetylacetonate), aluminum tris(ethylacetoacetate), and other organic aluminum compounds; zirconium tetra(acetylacetonate), zirconium tetrabutyrate, and other organic aluminum compounds; dibutyltin dioctate, dibutyltin dilaurate, butyltin-2-ethylhexoate, and other organic tin compounds; metallic salts of organic carboxylic acids such as tin naphthenate, tin oleate, tin butyrate, cobalt naphthenate, zinc stearate, and the like; hexylamine, dodecylamine phosphate, and other amine compounds and salts thereof; benzyltriethylammonium acetate and other quaternary ammonium salts; lower fatty acid salts of alkali metals such as potassium acetate, lithium nitrate, and the like; dimethylhydroxylamine, diethylhydroxylamine, and other dialkylhydroxylamines; and guanidine group-containing organosilicon compounds.

In the present composition, an amount of the condensation-reaction catalyst is an amount sufficient to promote crosslinking of the present composition. Specifically, the amount is preferably within a range of 0.01 to 20 parts by mass, and particularly preferably within a range of 0.1 to 10 parts by mass, each relative to 100 parts by mass of component (A) or an arbitrary organopolysiloxane other than component (A). This is because when the catalyst is essential, if the amount of the catalyst is below the lower limit of the range above, a resulting composition is not sufficiently crosslinked. On the other hand, if the amount is above the upper limit of the range above, the storage stability of a resulting composition is reduced.

Furthermore, when the present composition can be crosslinked by a free radical reaction with an organic peroxide, component (C) is the organic peroxide. Examples of the organic peroxide include benzoyl peroxides, dicumylperoxides, 2,5-dimethylbis(2,5-tert-butyl peroxy)hexane, di-tert-butyl peroxides, and tert-butyl perbenzoate.

An amount of the organic peroxide is an amount sufficient to crosslink the present composition. Specifically, the amount is preferably within a range of 0.1 to 5 parts by mass relative to 100 parts by mass of component (A) or an arbitrary organopolysiloxane other than component (A).

Furthermore, so long as an object of the present invention is not impaired, the present composition may contain another optional component, such as fumed silica, precipitated silica, fumed titanium dioxide, and other fillers, and fillers where the surface of these fillers has been hydrophobically treated with an organic silicon compound; and pigments, dyes, fluorescent dyes, heat-resistant additives, and flame retardant additives other than a triazole compound, plasticizers, and adhesion imparting agents.

If the present composition is crosslinkable, the method of crosslinking is not limited, and examples include methods of leaving the present composition at room temperature after molding and methods of heating the present composition at 50 to 200° C. after molding. Furthermore, a state of the crosslinked product obtained thereby is not limited, and examples thereof include thickened grease-like, or hardened, gel-like, low-hardness rubber-like, or high-hardness rubber-like, which can be sufficiently adhered to a member as a heat-dissipating material.

EXAMPLES

The organopolysiloxane, method for producing thereof, and thermally conductive silicone composition of the present invention will be described in detail based on Examples and Comparative Examples. Note that the properties in the Examples are values at 25° C.

Example 1

In a 1 L flask, 211 g (950.5 mmol) of 1,1,3,3,5,5-hexamethylcyclotrisiloxane and 165 g of toluene were mixed under a nitrogen stream, which was azeotropically dehydrated for 1 hour. After dehydration, the mixture was cooled to 30° C., to which 5.5 mL of a 1.6 N-hexane solution of n-butyl lithium (n-butyl lithium=8.8 mmol) was introduced and then stirred at 30° C. for 10 minutes. Next, 0.88 g (8.12 mmol) of trimethylchlorosilane was introduced to the mixture and stirred at 30° C. for 30 minutes. Thereafter, a mixture of 11.0 g (107.6 mmol) of vinyldimethylsilanol, 16.9 g of dimethylformamide and 52.7 g of acetonitrile was introduced to start the non-equilibrium polymerization reaction. After 6.5 hours after the start of the non-equilibrium polymerization reaction, 1.37 g (22.74 mmol) of acetic acid was introduced to the reaction mixture to stop the non-equilibrium polymerization reaction and obtain a dimethylpolysiloxane at one molecular chain terminal blocked with a dimethylvinyl siloxy group and at another molecular chain terminal blocked with a hydroxydimethylsiloxy group, serving as an intermediate. At this time, the conversion rate of the 1,1,3,3,5,5-hexamethylcyclotrisiloxane was 95%. Next, a low boiling point substance was distilled off from the resulting intermediate by heating at 95° C. under reduced pressure.

Then, 170.5 g (1150.2 mmol) of vinyltrimethoxysilane and 0.53 g (8.83 mmol) of acetic acid were introduced to the intermediate after the low boiling point substance was distilled off under reduced pressure and stirred at 130° C. for 4 hours, and the low boiling point substance was distilled off under reduced pressure at 150° C. After cooling, salt generated when the non-equilibrium polymerization reaction was stopped was filtered off to obtain 212 g of dimethylpolysiloxane.

When analyzed by a $^{29}$Si-NMR, the dimethylpolysiloxane was found to be a mixture of a dimethylpolysiloxane represented by the average formula:

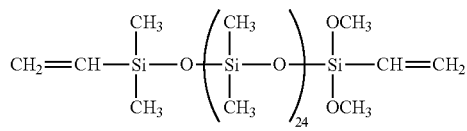

[Formula 16]

and a dimethylpolysiloxane represented by the average formula:

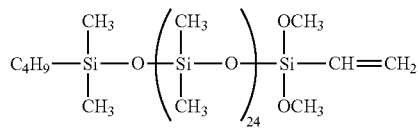

[Formula 17]

with a mass ratio of 92:8 (a content of vinyl groups: 2.6 mass %).

Example 2

191 g of dimethylpolysiloxane was obtained similarly to Example 1, except that 3.39 g (33.16 mmol) of vinyldimethylsilanol was used, 53.2 g (358.9 mmol) of vinyltrimethoxysilane and 0.28 g (4.66 mmol) of acetic acid were used, which were introduced to the intermediate in which a low boiling point substance was distilled off under reduced pressure in Example 1.

When analyzed by a $^{29}$Si-NMR, the dimethylpolysiloxane was found to be a mixture of a dimethylpolysiloxane represented by the average formula:

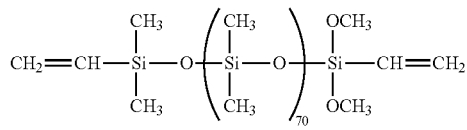

[Formula 18]

and a dimethylpolysiloxane represented by the average formula:

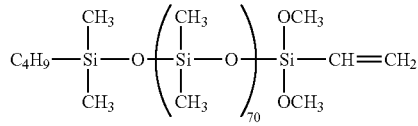

[Formula 19]

with a mass ratio of 81:19 (a content of vinyl groups: 0.91 mass %).

Example 3

In a 1 L flask, 221 g (995.5 mmol) of 1,1,3,3,5,5-hexamethylcyclotrisiloxane and 173 g of toluene were mixed under a nitrogen stream, which was azeotropically dehydrated for 1 hour. After dehydration, the mixture was cooled to 30° C., to which 12.0 mL of a 1.6 N-hexane solution of n-butyl lithium (n-butyl lithium=19.2 mmol) was introduced and then stirred at 30° C. for 1 hour. Next, 0.92 g (9.01 mmol) of acetic anhydride was introduced to the mixture, stirred at 100° C. for 30 minutes, and then cooled to 30° C. A mixture of 1.87 g (18.29 mmol) of vinyldimethylsilanol, 18.1 g of dimethylformamide, and 55.1 g of acetonitrile was introduced to this mixture at 30° C. to start a non-equilibrium polymerization reaction. After 1.7 hours after the start of the non-equilibrium polymerization reaction, 1.47 g (24.48 mmol) of acetic acid was introduced to the reaction mixture to stop the non-equilibrium polymerization reaction and obtain a dimethylpolysiloxane at one molecular chain terminal blocked with a dimethylvinyl siloxy group and another molecular chain terminal blocked with a hydroxydimethylsiloxy group, serving as an intermediate. At this time, the conversion rate of the 1,1,3,3,5,5-hexamethylcyclotrisiloxane was 98%. Next, a low boiling point substance was distilled off from the resulting intermediate by heating at 95° C. under reduced pressure.

Then, 30.1 g (203.1 mmol) of vinyltrimethoxysilane and 0.18 g (3.00 mmol) of acetic acid were introduced to the intermediate after the low boiling point substance was distilled off under reduced pressure and stirred at 130° C. for 4 hours. Furthermore, the low boiling point material was distilled off at 150° C. under reduced pressure. After cooling, salt generated when the non-equilibrium polymerization reaction was stopped was filtered off to obtain 205 g of methylpolysiloxane.

When analyzed by a $^{29}$Si-NMR, the dimethylpolysiloxane was found to be a mixture of a dimethylpolysiloxane represented by the average formula:

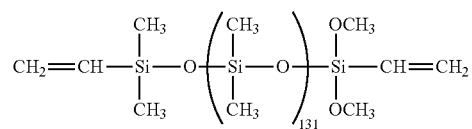

[Formula 20]

and a dimethylpolysiloxane represented by the average formula:

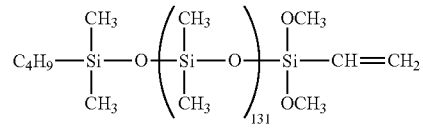

[Formula 21]

with a mass ratio of 78:22 (a content of vinyl groups: 0.49 mass %).

Example 4

197 g of dimethylpolysiloxane was obtained similarly to Example 3, except that 0.84 g (8.22 mmol) of vinyldimethylsilanol was used, 16.8 g (113.3 mmol) of vinyltrimethoxysilane and 0.20 g (3.33 mmol) of acetic acid were used, which were introduced to the intermediate in which a low boiling point substance was distilled off under reduced pressure in Example 3.

When analyzed by a $^{29}$Si-NMR, the dimethylpolysiloxane was found to be a mixture of a dimethylpolysiloxane represented by the average formula:

[Formula 22]

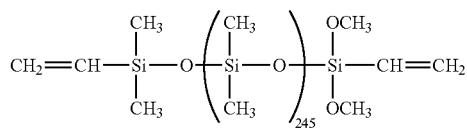

and a dimethylpolysiloxane represented by the average formula:

[Formula 23]

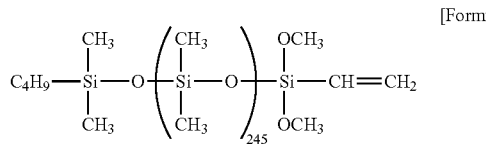

with a mass ratio of 65:35 (a content of vinyl groups: 0.24 mass %).

Examples 5 to 8 and Comparative Examples 1 and 2

Thermally conductive silicone compositions were prepared with the compositions listed in Table 1 and Table 2 using the following components. Note that in the thermally conductive silicone compositions, the amount of the crosslinking agent was set to an amount where silicon atom-bonded hydrogen atoms in the crosslinking agent is approximately 1.4 mols relative to 1 mol of vinyl groups in component (A).

The following components were used as component (A).
(A-1): a dimethylpolysiloxane prepared in Example 1
(A-2): a dimethylpolysiloxane prepared in Example 2
(A-3): a dimethylpolysiloxane prepared in Example 3
(A-4): a dimethylpolysiloxane prepared in Example 4
(A-5): a dimethylpolysiloxane represented by the average formula:

[Formula 24]

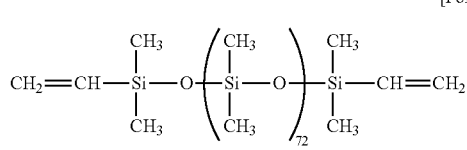

(a content of vinyl groups=0.95 mass %)
(A-6): a dimethylpolysiloxane represented by the average formula:

[Formula 25]

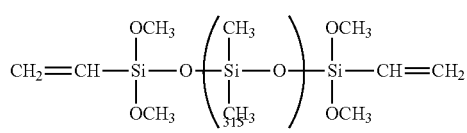

(a content of vinyl groups =0.23 mass %)

The following components were used as component (B).
(B-1): alumina powder with an average particle diameter (d50) of 34.5 μm (product name:DAW-45, manufactured by Denka Company Limited)
(B-2): alumina powder with an average particle diameter (d50) of 2 μm (product name:CB-P02, manufactured by Showa Denko K.K.)
(B-3): alumina powder with an average particle diameter (d50) of 0.3 μm (product name:ASFP-02, manufactured by Denka Company Limited)

The following components were used as crosslinking agents.
(C-1): a copolymer of methylhydrogensiloxane and dimethylsiloxane blocked with trimethylsiloxy groups at both molecular chain terminals (a content of silicon atom-bonded hydrogen atoms=approximately 0.76 mass %)
(C-2): a dimethylpolysiloxane blocked with dimethylhydrogensiloxy groups at both molecular chain terminals (a content of silicon atom-bonded hydrogen atoms=approximately 0.015 mass %)

The following component was used as a catalyst for a crosslinking reaction.
(D-1): a dimethylpolysiloxane solution blocked with vinyldimethylsiloxy groups at both molecular chain terminals and with a viscosity of 400 mPa·s and a platinum-1,3-divinyl-1,1,3,3-tetramethyldisiloxane complex (a content of platinum=approximately 0.6 mass %)

The following component was used as an inhibitor for a crosslinking reaction.
(E-1): 1,3,5,7-tetramethyl-1,3,5,7-tetravinyl-cyclotetrasiloxane Evaluation of Physical Properties of Thermally Conductive Silicone Composition and Cured Products Thereof Viscosities of the thermally conductive silicone compositions were measured using a rheometer MCR102 (manufactured by Anton Paar GmbH) at 25° C. Measurements were performed using a 20 mm plate, which was rotated at a shear rate of 5/s for 30 seconds and left for 10 minutes, and then sweeping the shear rate from 0.01/s. Table 1 shows the viscosities at a shear rate of 0.075/s.

Furthermore, the thermally conductive silicone composition was cured by heating at 150° C. for 60 minutes to prepare a silicone cured product with a width of approximately 10 mm, a length of approximately 50 mm, and a thickness of approximately of 2 mm. Using a rheometer MCR302 (manufactured by Anton Paar GmbH), the modulus of the silicone cured product due to torsional deformation was measured at 23° C. The measurement was performed by sweeping the frequency from 0.01 Hz. Table 1 shows the storage elastic moduli and loss tangents at 1 Hz.

Measurement of Thermal Resistance

The measurement was performed using a thermal resistance measurement device (manufactured by Hitachi, Ltd.) under a load of 50 N. An appropriate amount of a silicone grease (G-750 manufactured by Shin-Etsu Chemical Co., Ltd.) was applied to a 1 cm square silicone cured product of with a thickness of approximately 1 mm and sandwiched between heating and cooling shafts, and measurement was started after the sample reached a set temperature (50° C.±1°

C.). The thermal resistance value of the silicone grease measured in advance was subtracted from the obtained thermal resistance value to obtain the thermal resistance value of the sample (° C/W). Measurements were performed three times for each sample, and the average values are shown in Table 1.

TABLE 1

|  |  | Examples | | | |
|---|---|---|---|---|---|
|  |  | 5 | 6 | 7 | 8 |
| Composition of silicone composition (parts by mass) | (A-1) | 3.54 | — | — | — |
| | (A-2) | — | 4.57 | — | — |
| | (A-3) | — | — | 4.69 | — |
| | (A-4) | — | — | — | 4.77 |
| | (B-1) | 52.90 | 52.90 | 52.90 | 52.90 |
| | (B-2) | 36.70 | 36.70 | 36.70 | 36.70 |
| | (B-3) | 5.40 | 5.40 | 5.40 | 5.40 |
| | (C-1) | 0.69 | 0.35 | 0.23 | 0.15 |
| | (C-2) | 0.69 | — | — | — |
| | (D-1) | 0.06 | 0.06 | 0.06 | 0.06 |
| | (E-1) | 0.03 | 0.03 | 0.03 | 0.03 |
| Viscosity (Pa · s) | | $3.1 \times 10^3$ | $1.0 \times 10^3$ | $3.9 \times 10^3$ | $1.6 \times 10^4$ |
| Storage elastic modulus (Pa) | | $3.2 \times 10^9$ | $1.2 \times 10^9$ | $7.1 \times 10^8$ | $7.6 \times 10^8$ |
| Dielectric tangent | | 0.05 | 0.06 | 0.07 | 0.09 |
| Thermal resistance (° C./W) | | 1.90 | 2.08 | 2.08 | 1.92 |

TABLE 2

|  |  | Comparative Examples | |
|---|---|---|---|
|  |  | 1 | 2 |
| Composition of silicone composition (parts by mass) | (A-5) | 4.55 | — |
| | (A-6) | — | 4.85 |
| | (B-1) | 52.90 | 52.90 |
| | (B-2) | 36.70 | 36.70 |
| | (B-3) | 5.40 | 5.40 |
| | (C-1) | 0.37 | 0.07 |
| | (D-1) | 0.06 | 0.06 |
| | (E-1) | 0.03 | 0.03 |
| Viscosity (Pa · s) | | Not measurable due to Inability to blend predetermined amount of alumina | Not measurable due to inability to blend predetermined amount of alumina |
| Storage elastic modulus (MPa) | | | |
| Dielectric tangent | | | |
| Thermal resistance (° C./W) | | | |

From the results in Tables 1 and 2, by using components (A-1) to (A-4) in Examples 5 to 8, a paste form could be maintained even when 95 mass % of components (B-1) to (B-3) were included, and cured products could be obtained by heat curing. Based on the results, components (A-1) to (A-4) can be considered to be incorporated as designed as a portion of a crosslinked structure with an effect of reducing viscosity.

INDUSTRIAL APPLICABILITY

The organopolysiloxane of the present invention is a novel compound and can be used as a surface treatment agent for an inorganic powder, and particularly as a surface treatment agent for a thermally conductive powder. Furthermore, the silicone composition of the present invention uses the organopolysiloxane as a main agent or a surface treatment agent for a thermally conductive filler, and therefore can be used as a heat-dissipating agent for electrical and electronic components due to favorable handling/workability, even if it is highly loaded with a thermally conductive filler in order to obtain a silicone composition with high thermal conductivity.

The invention claimed is:
1. An organopolysiloxane represented by the general formula:

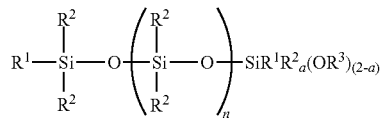

wherein, $R^1$s are the same or different aliphatic unsaturated monovalent hydrocarbon groups having 2 to 12 carbon atoms, $R^2$s are the same or different monovalent hydrocarbon groups having 1 to 12 carbon atoms and not having an aliphatic unsaturated bond, $R^3$s are the same or different alkyl groups having 1 to 3 carbon atoms, "n" is an integer of from 1 and 500, and "a" is 0 or 1.

2. The organopolysiloxane according to claim 1, being a surface treatment agent for an inorganic powder.

3. The organopolysiloxane according to claim 2, wherein the inorganic powder is a thermally conductive powder.

4. A method for producing the organopolysiloxane according to claim 1, the method comprising dealcohol condensation reacting:
  i) an organopolysiloxane represented by the general formula:

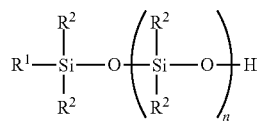

wherein, $R^1$ is an aliphatic unsaturated monovalent hydrocarbon group having 2 to 12 carbon atoms, $R^2$s are the same or different monovalent hydrocarbon groups having 1 to 12 carbon atoms and not having an aliphatic unsaturated bond, $R^3$ is an alkyl group having 1 to 3 carbon atoms, and "n" is an integer of from 1 and 500; and
  ii) an alkoxysilane represented by the general formula:

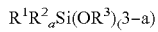

wherein, $R^1$ is the same as above or a different aliphatic unsaturated monovalent hydrocarbon group having 2 to 12 carbon atoms, $R^2$ is the same as above or a different monovalent hydrocarbon group having 1 to 12 carbon atoms and not having an aliphatic unsaturated bond, $R^3$s are the same or different alkyl groups having 1 to 3 carbon atoms, and "a" is 0 or 1.

5. A thermally conductive silicone composition comprising:
  (A) an organopolysiloxane represented by the general formula:

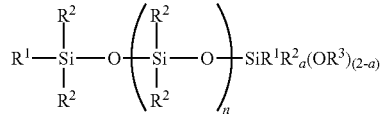

wherein, $R^1$s are the same or different aliphatic unsaturated monovalent hydrocarbon groups having 2 to 12 carbon atoms, $R^2$s are the same or different monovalent hydrocarbon groups having 1 to 12 carbon atoms and not having an aliphatic unsaturated bond, $R^3$s are the same or different alkyl groups having 1 to 3 carbon atoms, "n" is an integer of from 1 and 500, and "a" is 0 or 1; and (B) a thermally conductive filler.

6. The thermally conductive silicone composition according to claim 5, wherein an average particle diameter of component (B) is 0.01 to 100 μm.

7. The thermally conductive silicone composition according to claim 5, wherein component (B) is an alumina powder.

8. The thermally conductive silicone composition according to claim 7, wherein component (B) is a mixture of:

($B_1$) a spherical or rounded alumina powder with an average particle diameter of 5 to 50 μm, but excluding 5 μm powder; and ($B_2$) a spherical or amorphous alumina powder with an average particle diameter of 0.1 to 5 μm.

9. The thermally conductive silicone composition according to claim 8, wherein component (B) consists of 30 to 90 mass % of component ($B_1$) and 10 to 70 mass % of component ($B_2$).

10. The thermally conductive silicone composition according to claim 5, wherein an amount of component (B) is 500 to 3,000 parts by mass relative to 100 parts by mass of component (A).

11. The thermally conductive silicone composition according to claim 5, further comprising:

(C) a crosslinking agent.

12. An inorganic powder having a surface treatment, wherein the surface treatment comprises or is formed from the organopolysiloxane according to claim 1.

13. The inorganic powder having a surface treatment according to claim 12, wherein the inorganic powder is a thermally conductive powder.

* * * * *